United States Patent
Runge et al.

(10) Patent No.: US 12,492,683 B2
(45) Date of Patent: Dec. 9, 2025

(54) HEATING ELEMENT FOR AN OUTER SURFACE OF A WIND TURBINE ROTOR BLADE

(71) Applicant: Nordex Energy SE & Co. KG, Hamburg (DE)

(72) Inventors: Ines Runge, Henstedt-Ulzburg (DE); Konrad Sachse, Hamburg (DE); Adrian Dibbern, Norderstedt (DE); Stefan Magnus, Delingsdorf (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 19/043,145

(22) Filed: Jan. 31, 2025

(65) Prior Publication Data

US 2025/0257718 A1   Aug. 14, 2025

(30) Foreign Application Priority Data

Feb. 12, 2024   (EP) ..................... 24156985

(51) Int. Cl.
  *F03D 80/40*   (2016.01)
  *F03D 1/06*   (2006.01)

(52) U.S. Cl.
  CPC ......... *F03D 80/401* (2023.08); *F03D 1/0675* (2013.01); *F05B 2230/10* (2013.01)

(58) Field of Classification Search
  CPC ... F03D 80/401; F03D 1/0675; F05B 2230/10
  See application file for complete search history.

(56) References Cited

U.S. PATENT DOCUMENTS

| | | | | |
|---|---|---|---|---|
| 3,848,111 A | * | 11/1974 | Brouneus | H05B 3/265 219/448.11 |
| 4,386,749 A | * | 6/1983 | Sweet | B64D 15/12 244/134 D |
| 2005/0067532 A1 | | 3/2005 | Hindel et al. | |
| 2013/0022465 A1 | | 1/2013 | Stiesdal | |

(Continued)

FOREIGN PATENT DOCUMENTS

| | | |
|---|---|---|
| EP | 2 602 455 A1 | 6/2013 |
| EP | 2 843 228 A1 | 3/2015 |

(Continued)

OTHER PUBLICATIONS

Extended European search report of the European Patent Office dated Sep. 5, 2024 in European patent application 24156985.4 on which this application is based.

*Primary Examiner* — Aaron R Eastman
(74) *Attorney, Agent, or Firm* — Walter Ottesen, P.A.

(57) ABSTRACT

A heating element for an outer surface of a wind turbine rotor blade, wherein the heating element has a length and a width. The heating element includes a carbon fiber layer having a plurality of slots subdividing the carbon fiber layer into consecutive band sections defining a current path between a first connecting portion and a second connecting portion. The first connecting portion is adapted to be connected to a first power supply line and the second connecting portion is adapted to be connected to a second power supply line. The current path has a length of at least twice the length of the heating element.

12 Claims, 1 Drawing Sheet

(56) References Cited

U.S. PATENT DOCUMENTS

| | | | | |
|---|---|---|---|---|
| 2013/0170992 A1* | 7/2013 | Loewe | ................. | F03D 1/0675 |
| | | | | 29/611 |
| 2018/0213606 A1* | 7/2018 | Hu | ........................... | H05B 3/20 |
| 2020/0062408 A1* | 2/2020 | Bratianu-Badea | ..... | B64D 15/12 |
| 2022/0235736 A1* | 7/2022 | Seruntine | .............. | F03D 1/0675 |
| 2022/0349387 A1* | 11/2022 | Badger | ................ | F03D 1/0675 |

FOREIGN PATENT DOCUMENTS

| EP | 3 355 660 A1 | 8/2018 |
|---|---|---|
| EP | 4 223 643 A1 | 8/2023 |
| WO | 03/058063 A1 | 7/2003 |
| WO | 2014/173043 A1 | 10/2014 |

\* cited by examiner

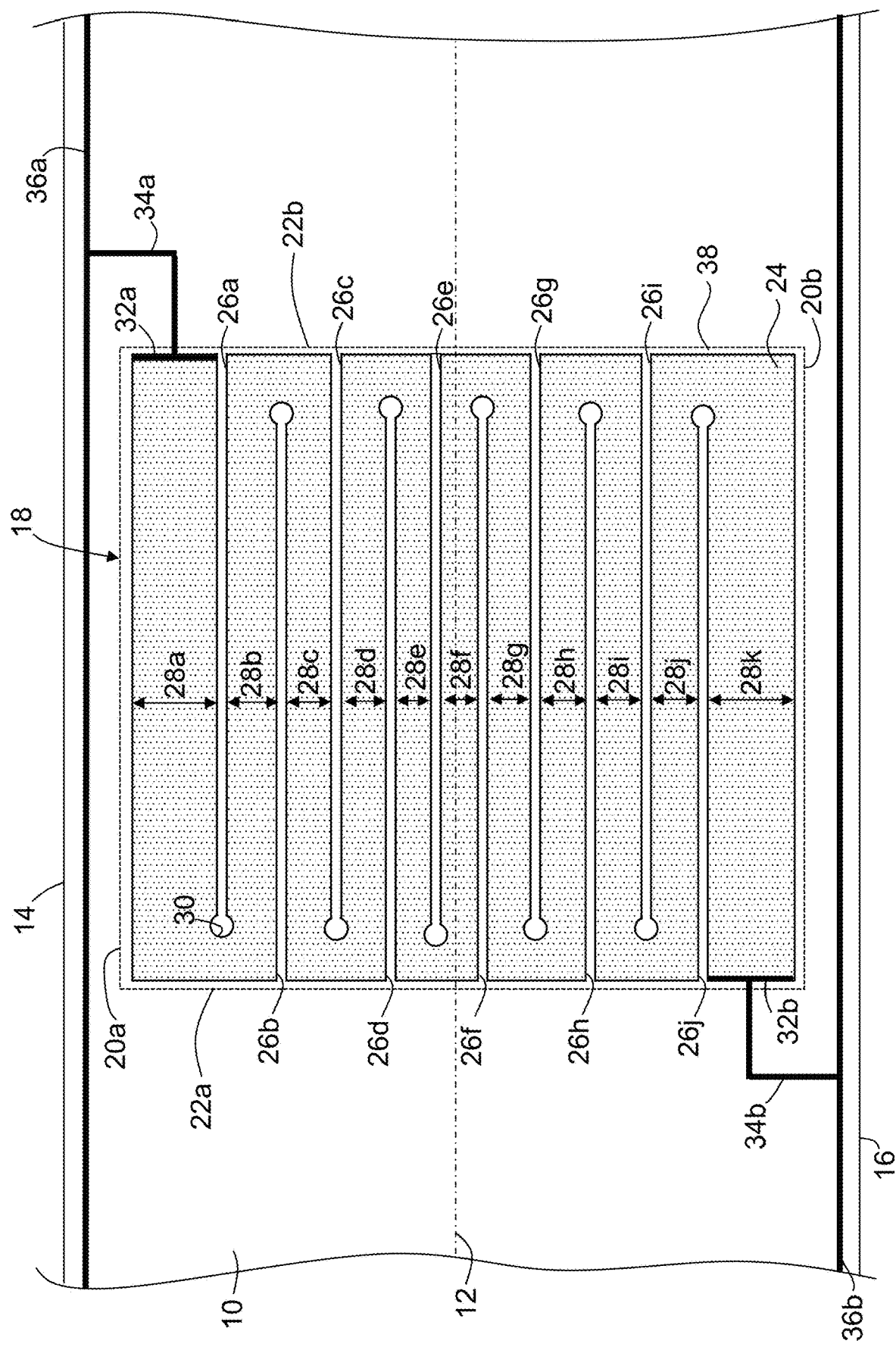

HEATING ELEMENT FOR AN OUTER SURFACE OF A WIND TURBINE ROTOR BLADE

CROSS-REFERENCE TO RELATED APPLICATIONS

This application claims priority of European patent application no. 24156985.4, filed Feb. 12, 2024, the entire content of which is incorporated herein by reference.

TECHNICAL FIELD

The disclosure relates to a heating element for an outer surface of a wind turbine rotor blade.

BACKGROUND

In cold climate conditions, ice accumulating on the outer surfaces of wind turbine rotor blades may diminish the aerodynamic efficiency, may cause imbalances and hence increased wear, and may even lead to injuries of persons or animals hit by ice dislodging from the wind turbine rotor. It is thus known to provide wind turbine rotor blades with heating devices for de-icing and/or anti-icing, that is for removing ice already present on or for preventing ice from forming on the surface.

To this end, some wind turbine rotors are equipped with an interior heating system guiding heated air through the interior of the rotor blades. Other heating systems are based on heating elements arranged directly at an outer surface of the wind turbine rotor blade, so that heat is applied only locally, preferably focusing on certain surface areas most likely affected by accumulating ice. The heating elements have a defined electrical resistance and are heated by an electric current flowing therethrough. The electrical resistance of the heating element and the supply voltage can be adapted so that the desired heating power per surface area is obtained.

A first type of heating elements use a flat material having a specific electrical resistance, such as a carbon fiber mat. These are applied over an extended surface area. The heating current is typically guided through these heating elements in a spanwise direction, from a first connection section of the heating element near a wind turbine rotor blade tip towards a second connection section of the heating element closer to a wind turbine blade root. US2013/0170992 shows a wind turbine rotor blade having several heating elements of the first type, connected to each other such that electrical supply lines need to be connected to the heating elements only near the blade root.

A second type of heating elements use single, thread-shaped heating elements such as wires or carbon fiber rovings as resistor material. EP 2 843 228 B1 shows an example in which each heating element has a carbon fiber bundle arranged in a meandering pattern, thereby forming a conductive path much longer than the heating element itself. This approach offers great flexibility as to the electrical resistance and the local distribution of the resulting heating power. In particular, the electrical resistance can be increased to a degree large enough so that the heating current generated by a common voltage supply can flow through the heating elements in a direction transverse to the spanwise direction. However, the heating elements are difficult to manufacture and must be handled and operated with great care, because even subtle damages to single fiber bundles may impair their functionality. In addition, detecting and repairing such damages is difficult.

US 2005/0067532 A1 discloses a radar absorbing electrothermal de-icer applied to a wing of an aircraft. It includes a layer of electrically conductive circuits such as wires arranged in a pattern over a surface of an airfoil.

U.S. Pat. No. 4,386,749 discloses a de-icer for use on the propeller of an aircraft. The de-icer includes a metal heating element having a zig-zag configuration, formed by a metal ribbon extending from the inboard end which is located adjacent to a shank portion of the propeller blade, toward the tip end of the propeller blade and back to the inboard end.

SUMMARY

Departing therefrom, it is an object of the disclosure to provide a heating element that is simple to manufacture and robust in use and that can be adapted to different heating requirements, as well as to provide a method of manufacturing such a heating element.

This object is achieved by a heating element for an outer surface of a wind turbine rotor blade. The heating element has a length and a width and includes: a first connecting portion and a second connecting portion; a carbon fiber layer having a plurality of slots subdividing the carbon fiber layer into consecutive band sections conjointly defining a current path between the first connecting portion and the second connecting portion; the current path having a length of at least twice the length of the heating element; and, the first connecting portion being configured to be connected to a first power supply line and the second connecting portion being configured to be connected to a second power supply line.

The heating element is configured for being fastened to an outer surface of a wind turbine rotor blade, wherein the heating element has a length and a width and includes a carbon fiber layer having a plurality of slots subdividing the carbon fiber layer into consecutive band sections establishing a current path between a first connecting portion and a second connecting portion, the first connecting portion being adapted to be connected to a first power supply line and the second connecting portion being adapted to be connected to a second power supply line and wherein the current path has a length of at least twice the length of the heating element.

The heating element may have an essentially rectangular shape. No matter what the specific shape of the heating element is, it has a length and a width and covers a certain surface area to which heat can be applied, namely via an electric heating current flowing through the heating element between the first and second connecting portions. The heating element includes a carbon fiber layer which is essentially flat and two-dimensional and covers essentially the entire surface area, apart from the slots. The carbon fiber layer extends over the entire length and over the entire width of the heating element. Width and length of the heating element may be on the order of 1 m each, for example. A thickness of the carbon fiber layer, in contrast, will typically be less than 1 mm.

As the name says, the carbon fiber layer includes carbon fibers. These carbon fibers are electrically conductive. The carbon fibers impart electrical conductivity to the heating element. The carbon fibers within the carbon fiber layer may be arranged in a certain pattern. In the alternative, they may be arranged without any specific order in random orientations such as in a veal or fleece. It is generally preferred to have a random or at least various different orientations of the individual carbon fibers, so that the electrical conductivity of the entire carbon fiber layer is not limited to one or more specific directions.

For applying the heating current to the heating element, the carbon fiber layer includes first and second connecting portions adapted for being connected to first and second power supply lines. The power supply lines may run in the longitudinal direction of the rotor blade and be arranged in the suction side shell and pressure side shell respectively. The connecting portions of the carbon fiber layer may for example include a metal strip contacting a large number of the carbon fibers. When a supply voltage is connected to the first and second connecting portions, a heating current will flow between these portions along a current path.

In accordance with the disclosure, the carbon fiber layer is provided with a plurality of slots subdividing the carbon fiber layer into consecutive band sections which establish the current path. Each slot forms an insulating barrier between adjacent consecutive band sections, so that the current cannot cross the slots, but must flow along the consecutive band sections.

Via the slots, a current path is established that has a length of at least twice the length of the heating element. The length of the current path may be even much longer, such as for example at least five times or even at least 10 times of the length of the heating element. The length of the current path depends on the number and arrangement of the slots.

The length of the current path in combination with the electrical conductivity of the consecutive band sections determines the electrical resistance of the heating element. This means that the electrical resistance can easily be adapted to the specific heating requirements by selecting an adequate number and arrangement of the slots. In particular, it is possible to configure a heating element covering a desired surface area and having a desired length such that it can be operated with a power supply providing a certain voltage.

In contrast to commonly known heating elements of the first type described above, the disclosure allows using a carbon fiber layer such as a carbon fiber mat, for example, in combination with a standard power supply for various different surface areas which may in particular have a length shorter than a typical spanwise extension of a desired heating area.

A second advantage of the disclosure is that the size of the heating element can be selected as required for a specific application, while it is easy to cover the entire area with the essentially flat carbon fiber layer. In particular, this is much easier than when having to arrange a heating material of the second type discussed above based on a single conductor having to be arranged in a complicated pattern in order to cover the desired surface area.

A third advantage is that the heating element, once fastened to a wind turbine rotor blade, is much more robust than the second type heating elements because any small damages extending over an area which is small compared to the width of one of the consecutive band sections will most likely not affect proper functioning of the heating element.

In an aspect, the first and second connecting portions are located on opposite ends of the carbon fiber layer. Provided the heating element and/or the carbon fiber layer has an essentially rectangular shape with a pair of first opposite edges arranged along the width direction and a pair of second opposite edges arranged along the length direction, the opposite ends may be arranged on two opposite ends of one of these edges, or at two opposite edges. For example, the first connecting portion may be arranged at an intermediate section of one of the first edges and the second connecting portion may be arranged on an intermediate section of the other first edge. The first and second connecting portions may also be arranged at a first end of one of the edges each, wherein these ends may be arranged at the same side of the carbon fiber layer, or diagonally across. Providing the first and second connecting portions on opposite ends of the carbon fiber layer allows arranging the heating element on a wind turbine rotor blade such that the connecting portions are located close to the corresponding power supply lines.

In an aspect, the heating element includes an electrically insulating carrier layer carrying the carbon fiber layer. The carrier layer may extend over the full length of the heating element and/or may bridge the slots. The carrier layer imparts mechanical stability to the heating element which facilitates handling of the heating element. When the carrier layer bridges the slots, this helps maintaining the adjacent band sections in the desired distance from each other.

In an aspect, the slots have a width of at least 1 mm. If desired, the width of the slots may be larger, such as for example at least 4 mm or at least 8 mm. The width of the slots can be selected such that proper insulation between adjacent band sections is obtained while at the same time the area not covered with the heatable carbon fiber layer is minimized.

In an aspect, the band sections have a width of at least 20 mm. The width may also be at least 50 mm. This makes it easy to cover a large surface area with a manageable number of band sections.

In an aspect, a width of the band sections and/or a width of the slots changes along the current path. As mentioned above, the width of the band sections in combination with the electrical properties of the carbon fiber material determines the electrical resistance and hence the heating capacity. Varying the width of the band sections along the current path as well as varying the width of the slots along the current path therefore allows tailored heat supply.

In an aspect, the slots are arranged in parallel and along the length direction or along the width direction of the heating element. Parallel slots in particular can be used for establishing a meandering current path with consecutive band sections of constant width.

In an aspect, at least one of the slots begins at an edge of the carbon fiber layer. In particular, every other slot may begin at one edge of the carbon fiber layer while the remaining slots may begin at the opposite edge, thereby establishing a meandering current path.

The carrier layer includes an electrically insulating material, so that it will not contribute to electrical connections between the band sections. The carrier layer may include a fibrous material, in particular glass fibers, for example a thin fiber mat. A fibrous carrier layer can easily be integrated into a rotor blade structure, for example in a laminating or vacuum infusion process.

In an aspect, at least one of the slots has a widened end section. The widened end section may be essentially circular with a radius of curvature being larger than a width of the remaining portion of the respective slot. The end section, together with the adjacent slot section, may have a keyhole shape. A widened end section reduces the current density next to the slot end, and therefore prevents local overheating.

In an aspect, a band section in a central part of the current path has a width smaller than a width of a band section near the first connecting portion and/or near the second connecting portion. The consecutive band sections are connected in series, so that the same current flows along the entire current path. Sections with a smaller width have a smaller cross-section of the conductive material and thus a larger electrical resistance. For a given heating current, the local heating power is proportional to the electrical resistance, so that band sections with smaller width have a higher heating power which in addition is concentrated on a smaller surface area. Arranging band sections with a smaller width in a central part of the current path therefore forms a heating element with heating power concentrated on a central area. This central area may be placed where the highest heating power is required, such as for example along a leading edge of the wind turbine rotor blade.

In an aspect, the carbon fiber layer covers at least 70% of a surface area covered by the heating element. As touched upon above, the surface area covered by the heating element may include some relatively small regions where the carbon fiber layer is not present, such as within the slots. Keeping this area smaller than 30% of the entire surface area covered by the heating element will allow for an efficient de-icing/anti-icing of the entire surface area.

In an aspect, the carbon fiber layer includes a fleece including carbon fibers arranged in various, random orientations. As has been explained above, such an arrangement of the individual carbon fibers results in an electrical conductivity of the carbon fiber layer not focused on any specific direction. As a consequence, the current path can be guided along any direction within the carbon fiber layer, so that the slots can be arranged as desired.

In an aspect, the carbon fiber layer includes a fabric including carbon fibers arranged in at least two, in particular in at least three different directions. Using such a carbon fiber layer offers a good compromise between different possible current directions and mechanical integrity/tear resistance.

In an aspect, the heating element is fastened to a wind turbine rotor blade such that the first connecting portion is arranged on a suction side of the wind turbine rotor blade and the second connecting portion is arranged on a pressure side of the wind turbine rotor blade. In this aspect, the heating element can easily be connected to first and second power supply lines arranged on different sides of the wind turbine rotor blade, as is desirable in some wind turbine rotor blade configurations because down conductors of a lightning protection system which are guided along the pressure and suction sides of the wind turbine rotor blade can be used as power supply lines for the heating element.

The above-stated object is also solved by the method of making a heating element for an outer surface of a wind turbine rotor blade. The method includes the following steps:
  providing a carbon fiber layer;
  forming a plurality of slots within the carbon fiber layer thereby subdividing the carbon fiber layer into consecutive band sections establishing a current path between a first connection portion and a second connecting portion, wherein the current path has a length of at least twice the length of the carbon fiber layer; and,
  defining a first connecting portion of the carbon fiber layer and a second connecting portion of the carbon fiber layer, wherein the first connecting portion is adapted to be connected to a first power supply line and the second connecting portion is adapted to be connected to a second power supply line.

Carrying out the above method results in a heating element for an outer surface of a wind turbine rotor blade, the heating element having a length and a width and including: a first connecting portion and a second connecting portion; a carbon fiber layer having a plurality of slots subdividing the carbon fiber layer into consecutive band sections conjointly defining a current path between the first connecting portion and the second connecting portion; the current path having a length of at least twice the length of the heating element; and, the first connecting portion being configured to be connected to a first power supply line and the second connecting portion being configured to be connected to a second power supply line.

The above explanations on the heating element apply to the method as well. In the first step of the method, a carbon fiber layer is provided. The carbon fiber layer may have an essentially rectangular shape. It does not include the slots formed only in the second step of the method, but extends continuously over the overall dimensions of the carbon fiber layer.

The plurality of slots formed in the second step may be carried out by punching, if desired via a roller, or by any suitable cutting process, in particular by laser cutting or water cutting.

Defining the first and second connecting portions of the carbon fiber layer may be limited to selecting adequate portions of the carbon fiber layer, but may also include integrating into or connecting with the selected portions a suitable connecting member, such as for example a metal strip.

In an Aspect, the Method Includes the Following Additional Steps:
  providing an electrically insulating carrier layer and
  connecting the carbon fiber layer to the carrier layer.

The five resulting steps of the method can be carried out in different orders. In particular, the electrically insulating carrier layer may be provided and connected to the carbon fiber layer before or after the plurality of slots are formed.

In an aspect, the method is a method of making a wind turbine rotor blade with a heating element and includes the following steps:
  manufacturing of a heating element providing a carbon fiber layer having a length and a width;
  forming a plurality of slots within the carbon fiber layer thereby subdividing the carbon fiber layer into consecutive band sections defining a current path between a first connecting portion and a second connecting portion, wherein the current path has a length of at least twice the length of the carbon fiber layer;
  configuring the first connecting portion of the carbon fiber layer and the second connecting portion of the carbon fiber layer so as to be connectable to a first power supply line and so as to be connectable to a second power supply line, respectively;
  providing an electrically insulating carrier layer; and,
  fastening the carbon fiber layer to an outer surface of the wind turbine rotor blade, wherein the carrier layer is either fastened to the outer surface or is removed after the carbon fiber layer has been fastened to the outer surface.

First, a heating element is manufactured, the heating element including an electrically insulated carrier layer connected to the carbon fiber layer. Then, the carbon fiber layer is fastened to an outer surface of a wind turbine rotor blade, wherein the disclosure foresees two different alternatives. In a first alternative, the carrier layer is fastened to the outer surface of the wind turbine rotor blade as well, so that the carrier layer becomes an integral part of the wind turbine rotor blade. In the second alternative, the carrier layer is removed after the carbon fiber layer has been fastened to the outer surface. In this alternative, the carrier layer is used as a transfer layer. Once the carbon fiber layer has been fastened to the outer surface of the wind turbine rotor blade, the carrier layer is no longer needed to keep the carbon fiber layer in the desired shape, and is disposed of.

BRIEF DESCRIPTION OF DRAWING

The invention will now be described with reference to the drawing wherein:

FIG. 1 shows a heating element fastened to a wind turbine rotor blade in a schematic view.

DETAILED DESCRIPTION

FIG. 1 shows a section of a wind turbine rotor blade 10 having a leading edge 12 facing the viewer. The wind turbine rotor blade 10 includes a suction side 14 shown above the leading edge 12, and a pressure side 16 shown below the leading edge 12.

A heating element 18 is fastened to an outer surface of the wind turbine rotor blade 10. The heating element 18 has a rectangular shape with two first opposing edges 20a, 20b arranged substantially parallel to the leading edge 12, and two second opposing edges 22a, 22b arranged substantially perpendicular to the leading edge 12. Each of the two opposing edges 20a, 20b defines a width of the heating element 18, and each of the two second opposing edges 22a, 22b defines a length of the heating element 18.

The heating element 18 includes a carbon fiber layer 24 which is subdivided by a plurality of slots 26a to 26j into consecutive band sections 28a to 28k. These band sections 28a to 28k each extend essentially parallel to the leading edge 12 and over the entire width of the carbon fiber layer 24, essentially corresponding to the entire length of the heating element 18. Each band section 28a to 28k has a width indicated in FIG. 1 by a double arrow next to the reference numerals 28a to 28k.

Each of the slots 26a to 26j begins from one of the opposing edges 22a or 22b, respectively, and ends in a circular, widened section 30 as is indicated in FIG. 1 for slot 26a only.

The carbon fiber layer 24 includes a first connecting portion 32a and a second connecting portion 32b. The first connecting portion 32a is connected to a first power supply line 34a, the second connecting portion 32b is connected to a second power supply line 34b. The first power supply line 34a is connected to a first down conductor 36a arranged on the suction side 14, running along the wind turbine rotor blade length. The second power supply line 34b is connected to a [first] second down conductor 36b arranged on the pressure side 16, also running along the wind turbine rotor blade length.

The heating element 18 includes an electrically insulating carrier layer 38 covering the entire surface area of the heating element 18. The electrically insulating carrier layer 38 extends continuously between the four opposing edges 20a, 20b, 22a, 22b and bridges the slots 26a to 26j.

A current path is provided running from the first connecting portion 32a through each of the band sections 28a to 28k to the second connecting portion 32b. As there are eleven band sections 28a to 28k in the example shown (any number of band sections can be realized, for example at least three band sections formed by two slots), the length of the current path is about eleven times the width of the heating element 18, which is much longer than twice the length of the heating element 18. The band sections 28e and 28f form a central part of the current path and have a smaller width than the band sections 28a, 28k near the connecting portions 32a, 32b.

FIG. 1 shows a section of a rotor blade with one heating element 18 only. One may arrange various heating elements 18 side-by-side along the leading edge 12 of the wind turbine rotor blade to cover parts of the surface area or the entire surface area of the wind turbine rotor blade that requires heating. The heating elements 18 will then be connected to the down conductors 36a, 36b in parallel.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine rotor blade
12 leading edge
14 suction side
16 pressure side
18 heating element
20a, 20b first opposing edges
22a, 22b second opposing edges
24 carbon fiber layer
26a-26j slots
28a-28k band sections
30 widened end section
32a first connecting portion
32b second connecting portion
34a first power supply line
34b second power supply line
36a first down conductor
36b second down conductor
38 carrier layer

The invention claimed is:

1. A heating element for an outer surface of a wind turbine rotor blade, the heating element having a length and a width and comprising:
a first connecting portion and a second connecting portion;
a carbon fiber layer having a plurality of slots subdividing said carbon fiber layer into consecutive band sections conjointly defining a current path between said first connecting portion and said second connecting portion;
said current path having a length of at least twice the length of said heating element; and,
said first connecting portion being configured to be connected to a first power supply line and the second connecting portion being configured to be connected to a second power supply line,
wherein at least one of said plurality of slots has a widened end section.

2. The heating element of claim 1, wherein said first and second connecting portions are located on respective opposite ends of said carbon fiber layer.

3. The heating element of claim 1, said heating element further comprising an electrically insulating carrier layer carrying said carbon fiber layer.

4. The heating element of claim 3, wherein said electrically insulating carrier layer carries said carbon fiber layer in accordance with at least one of the following:
i) said electrically insulating carrier layer extends over the full length of the heating element; and, ii) said electrically insulating carrier layer bridges said plurality of slots.

5. The heating element of claim 1, wherein at least one of the following applies:
   i) said plurality of slots have a width of at least 1 mm;
   ii) said band sections have a width of at least 20 mm;
   iii) a width of the band sections changes along said current path; and,
   iv) a width of the plurality of slots changes along said current path.

6. The heating element of claim 1, wherein said plurality of slots are arranged in parallel and along the length-direction or along the width-direction of the heating element.

7. The heating element of claim 1, wherein said carbon fiber layer defines an edge and at least one of said plurality of slots begins at said edge of said carbon fiber layer.

8. The heating element of claim 1, wherein a central band section of said current path has a width less than at least one of the following:
   i) a width of the band section near said first connecting portion; and,
   ii) a width of the band section near said second connecting portion.

9. The heating element of claim 1, wherein said carbon fiber layer covers at least 70% of a surface area covered by said heating element.

10. The heating element of claim 1, wherein said carbon fiber layer comprises a fabric including carbon fibers arranged in at least one of the following ways:
    i) in at least two different directions; and,
    ii) in at least three different directions.

11. A heating element assembly for an outer surface of a wind turbine rotor blade, the heating element assembly comprising:
    a first power supply line and a second power supply line;
    a heating element having a length and a width and including:
    a first connecting portion and a second connecting portion;
    a carbon fiber layer having a plurality of elongated openings subdividing said carbon fiber layer into consecutive band sections conjointly defining a zig-zag current path between said first and second connecting portions;
    said first connecting portion being connected to said first power supply line and said second connecting portion being connected to said second power supply line; and,
    said current path having a length of at least twice the length of said heating element;
    wherein at least one of said elongated openings has a widening formed at an inner end of said at least one elongated opening to reduce current density in said current path next to the end of said at least one elongated opening and so prevent local overheating.

12. The heating element assembly of claim 11, wherein said widening is formed to have a keyhole configuration.

* * * * *